(12) United States Patent
Ceu

(10) Patent No.: US 9,093,922 B2
(45) Date of Patent: Jul. 28, 2015

(54) ADVANCED CIRCUIT ARRANGEMENT OF TRANSFORMERLESS 1 PHASE PV INVERTER

(75) Inventor: Pail Ceu, Felsozolamali (HU)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 237 days.

(21) Appl. No.: 13/817,312

(22) PCT Filed: Aug. 3, 2011

(86) PCT No.: PCT/KR2011/005696
§ 371 (c)(1),
(2), (4) Date: Aug. 21, 2013

(87) PCT Pub. No.: WO2012/023718
PCT Pub. Date: Feb. 23, 2012

(65) Prior Publication Data
US 2013/0322136 A1  Dec. 5, 2013

(30) Foreign Application Priority Data

Aug. 17, 2010  (HU) ..................................... 1045527

(51) Int. Cl.
*H02M 7/5387* (2007.01)
*H02J 3/38* (2006.01)

(52) U.S. Cl.
CPC ........ *H02M 7/5387* (2013.01); *H02M 7/53873* (2013.01); *H02J 3/383* (2013.01); *Y02E 10/563* (2013.01)

(58) Field of Classification Search
CPC ..... H02M 1/12; H02M 1/32; H02M 3/33507; H02M 7/537; H02M 7/53871; H02M 7/5387
USPC ............ 363/40, 55, 56.01, 56.02, 95, 97, 98, 363/131, 132
See application file for complete search history.

(56) References Cited

U.S. PATENT DOCUMENTS

| | | | |
|---|---|---|---|
| 5,684,688 A | 11/1997 | Rouaud et al. | |
| 5,710,698 A | 1/1998 | Lai et al. | |
| 6,330,170 B1 | 12/2001 | Wang et al. | |
| 7,342,362 B2 | 3/2008 | Lin | |
| 7,843,714 B2 * | 11/2010 | Bremicker et al. | ........... 363/132 |

FOREIGN PATENT DOCUMENTS

| | | |
|---|---|---|
| HN | 1045527 | 8/2010 |
| JP | 2010-081788 | 4/2010 |
| WO | 2012/023718 A2 | 2/2012 |

* cited by examiner

*Primary Examiner* — Adolf Berhane
(74) *Attorney, Agent, or Firm* — Sherr & Jiang, PLLC

(57) ABSTRACT

Disclosed is an inverter with outputs being connected through two reactors to a utility network, while an energy storage capacitor (C) is connected to the PV array (P) such that the C + and − terminals are connected to two half bridges creating an H bridge so that the AC node of one half bridge is connected to the anode of a diode (D1) and the cathode of a diode (D2). An AC node of the other half bridge is connected to an anode of a diode (D3) and a cathode of a diode (D4), while the diodes form a diode bridge having a positive node connected to a transistor's (V5) collector and an anode of a diode (D5), the cathode of the diode (D5) being connected to C's positive terminal.

11 Claims, 4 Drawing Sheets

ADVANCED CIRCUIT ARRANGEMENT OF TRANSFORMERLESS 1 PHASE PV INVERTER

CROSS-REFERENCE TO RELATED APPLICATIONS

This application is the United States National Phase under 35 U.S.C. §371 of PCT International Patent Application No. PCT/KR2011/005696, which designated the United States of America, having an International Filing date of Aug. 3, 2011, and claiming priority to Hungarian Patent Application No. 1045527, filed Aug. 17, 2010.

BACKGROUND OF THE INVENTION

1. Technical Field

The subject of the invention is a DC energy supplying into the 1 phase utility network without transformer. The invention deals with a PV array energy conversion, too.

2. Background Art

It is well known that the H bridges are often applied for direct current energy conversion and feeding into utility network without isolation transformer.

There are various gating patterns for controlling H bridges. However, for the PV application, the useful solutions are limited due to the PV array stray capacitance to the ground. So the usual solution is gating one diagonal with a pulse width modulation (PWM) signal in positive half period whilst the other diagonal is prohibited. The other diagonal is gated with a PWM signal in the negative half period whilst the previous one is prohibited. The two diagonals change role in every half utility network period.

It is also well known that such a gating system can provide only two voltage levels on the output on the H bridge, namely, positive or negative voltage if the AC current is not discontinuous.

The disadvantage of this type of circuit arrangement and control method is that the L,C or L,C,L filter on the output of the H bridge is bigger if it is compared to a multi level system.

It shall be mentioned that further drawback is the unnecessary energy swing between the output filter circuit and the H bridge DC filter capacitor in every PWM period.

SUMMARY OF THE INVENTION

Embodiments disclosed herein provide an inverter comprising: an AC output connected to the utility grid through two reactors; an energy storage capacitor connected to a PV array's terminals in such a way that two half bridges are connected to the positive (+) and negative (−) terminals of the energy storage capacitor creating an H bridge characterized in that the AC node of one of the half bridges is connected to the anode of a first diode and the cathode of a second diode whilst an AC node of the other half bridge is connected to an anode of a third diode and a cathode of a fourth diode whilst the first, second, third and fourth diodes form a diode bridge, wherein a positive node of the diode bridge is connected to a transistor's collector and an anode of a fifth diode, the cathode of the fifth diode being connected to the energy storage capacitor's positive terminal, and wherein the negative node of the diode bridge is connected to an emitter of the transistor and a sixth diode's cathode, the anode of the sixth diode connected to the negative terminal of the energy storage capacitor.

DISCLOSURE OF INVENTION

Embodiments herein provide a simple switching arrangement, which eliminates the known disadvantages and also uses a small number of items and high efficiency to offer an economical solution.

LIST OF REFERENCE SYMBOLS

+=positive
−=negative
I.=half bridge
II.=half bridge
P=solar array
C=energy storage capacitor
V1, V2, V3, V4, V5=transistors
D1, D2, D3, D4, D5, D6=diodes
L1, L2=reactor
U=utility network
F=ground This innovation is to add a fifth semiconductor switching element into the traditional H bridge 1-phase inverter, which allows 3 types of inverter output voltages and the output filter is able partly to feed the energy into the utility network and partly to store the energy during the PWM modulation, when the semiconductor H bridge diagonals are off condition. This solution is also sufficient to use a reduced-size filter with same THD (Total Harmonic Distortion).

The new circuit arrangement disclosed is able to provide so called quiet DC bus from the PV array avoiding the ageing the PV array and EMC troubles. This new circuit arrangement increases the efficiency of the energy conversion with reduced AC side filter and the taking out of the unnecessary energy swings mentioned above.

A part of semiconductor switching elements applied in the ZVS (Zero Switching Volatage) mode significantly reduces switching losses.

One of the major advantages is that the new circuit disclosed achieves a current direction insensitive freewheel circuit for the power flow compared to, e.g., HERIC and H5 topologies, so the solution meets the European Union's requirements, which came into force July of 2010, in that the inverters supplying low-voltage utility network shall be able to provide reactive power too, thus helping the grid management.

As mentioned above, embodiments herein provide a DC power conversion into the 1 phase utility network without isolation transformer, which is advantageously used for solar panels to supply the retail network, because the solutions has few switching elements, high efficiency, a "quiet" DC bus, and is capable of impressive performance while at the same time ensuring the required reactive power too.

The following circuit layout is described on the basis of diagrams according to the invention and its method of operation.

Figure 1:
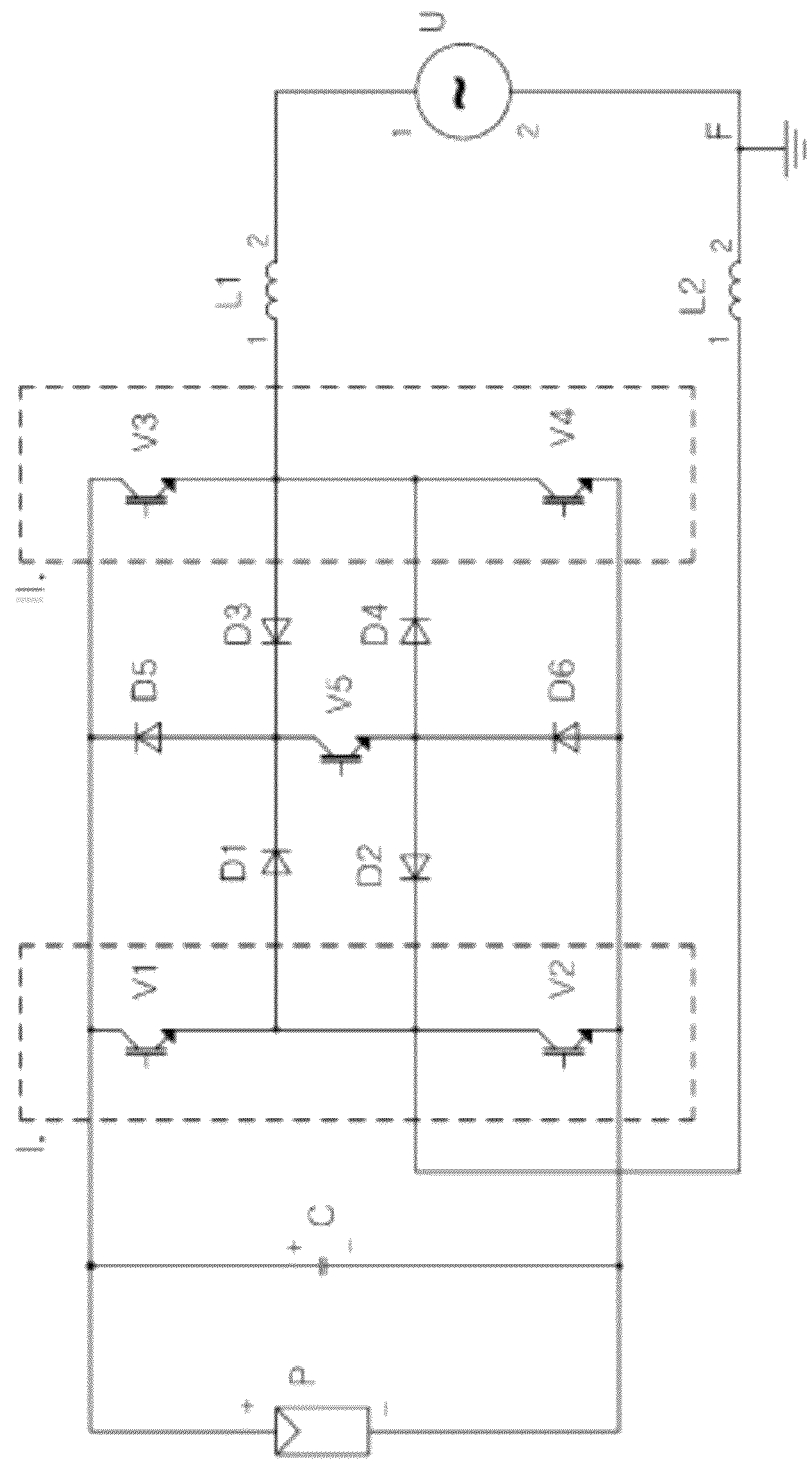
FIG. 1 shows the circuit arrangement of converter for PV energy feeding to the utility network.

On Referring now to FIG. 1, the inverter arrangement can be seen, supplied by PV array.

The output of the inverter is connected to the utility network without isolation transformer.

Our circuit arrangement is supplied by a P PV array which a positive (+) terminal connected to a + terminal of C energy storage capacitor, collector of V1, V3 transistors and cathode of D5 diode.

The negative (−) terminal of P PV array is connected to − terminal of C energy storage capacitor, emitter of V2, V4 transistors and anode of D6 diode.

The emitter of V1 transistor, collector of V2 transistor, anode of D1 diode and cathode of D2 diode are connected to terminal 1 of L2 reactor.

Cathode of D1,D3 diodes and anode of D5 diode are connected to collector of V5 transistor.

Emitter of V3 transistor, anode of D3 diode, cathode of D4 diode and collector of V4 transistor are connected to terminal 1 of L1 reactor.

Emitter of V5 transistor and anode of D2, D4 diodes are connected to cathode of D6 diode. The terminal 2 of L1 reactor connected to terminal 1 of U utility grid.

The terminal 2 of L2 reactor connected to terminal 2 of U utility grid and F ground terminal.

The operation of circuit diagram introduced on FIG. 1 is the following:

The P PV array charges continuously the C energy storage capacitor. The positive half period is compared to the ground V2, and V3 transistor gating are modulated as shown on FIG. 2. V5 transistor is gated on state during the V2 and V3 transistors off state as shown on FIGS. 3 and 4. The modulated output voltage filtered by L1 and L2 reactors produce a low harmonics content sinusoidal current and the energy flows from the C energy storage capacitor to the U utility network.

Figure 2:
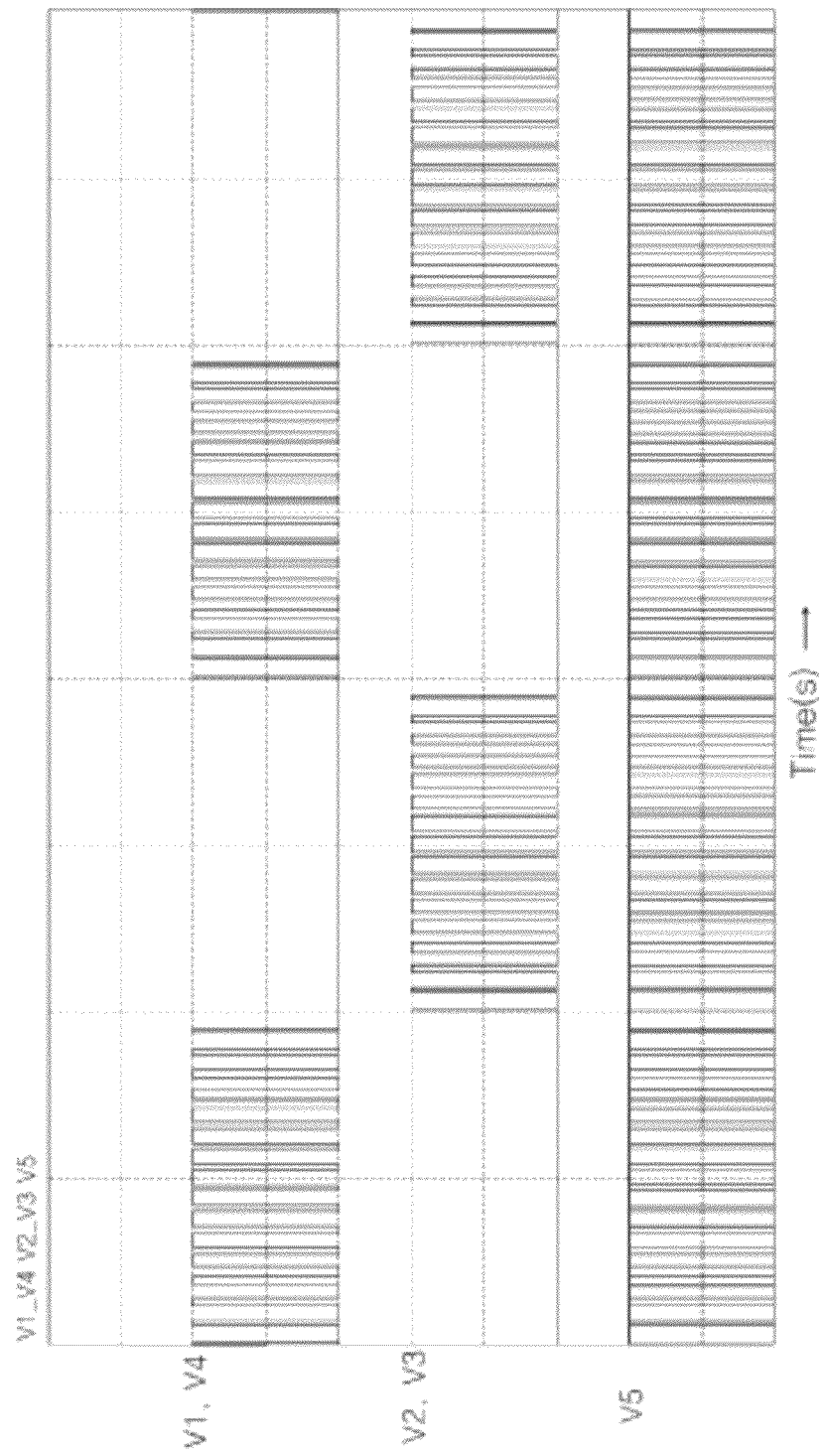
FIG. 2 shows the used semiconductor switches' (V1, V2, V3, V4, V5).

The negative half period is compared to the ground V1, and V4 transistor gating are modulated as shown on FIG. 2. V5 transistor is gated on state during the V1 and V4 transistors off state as shown on FIGS. 3 and 4. The modulated output voltage filtered by L1 and L2 reactors produce a low harmonics content sinusoidal current and the energy flows from the C energy storage capacitor to the U utility network.

The PWM modulation runs with constant frequency as it is introduced on FIG. 2, and the injected current as well as power is controlled by means of modulation depth.

Figure 3:
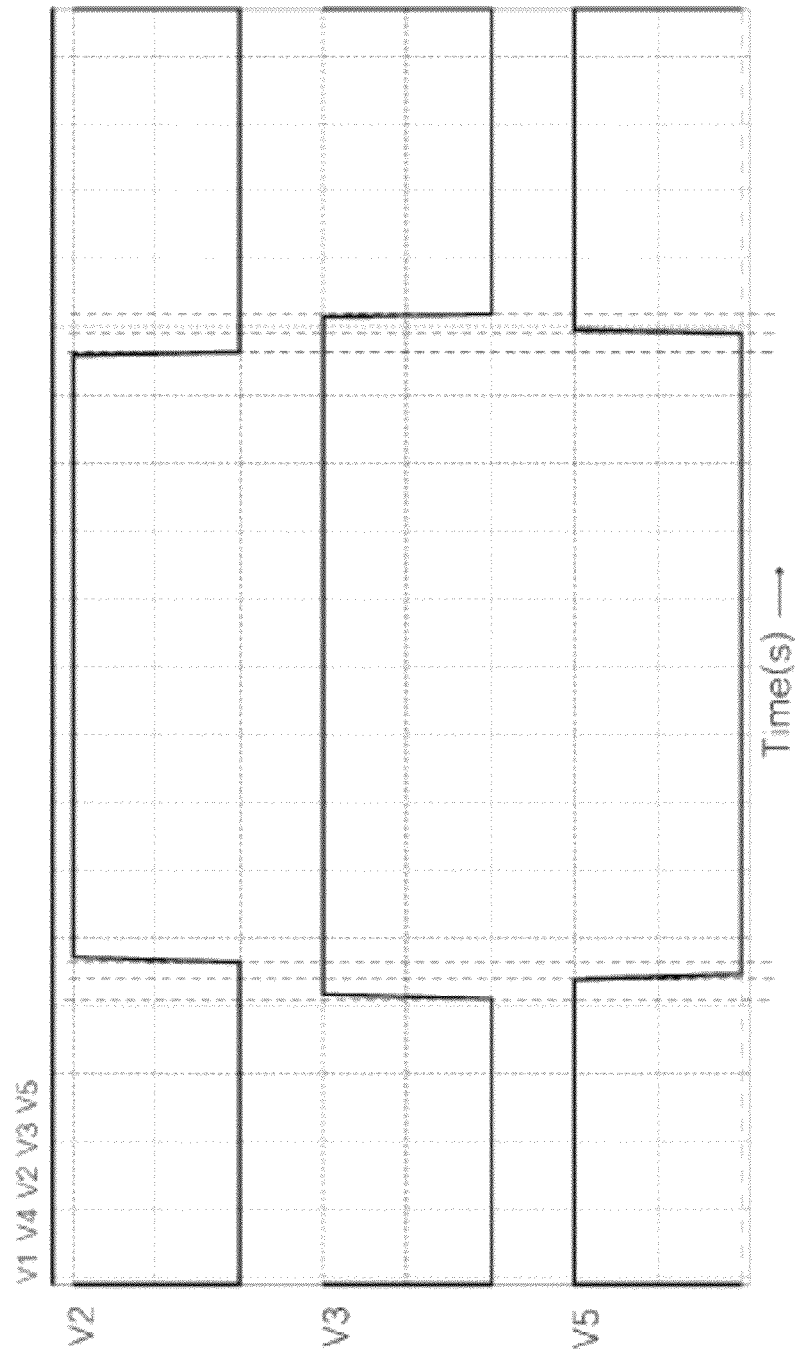
FIG. 3 shows the V2, V3, V5 semiconductor switches gatings in a single PWM modulation period.
Figure 4:
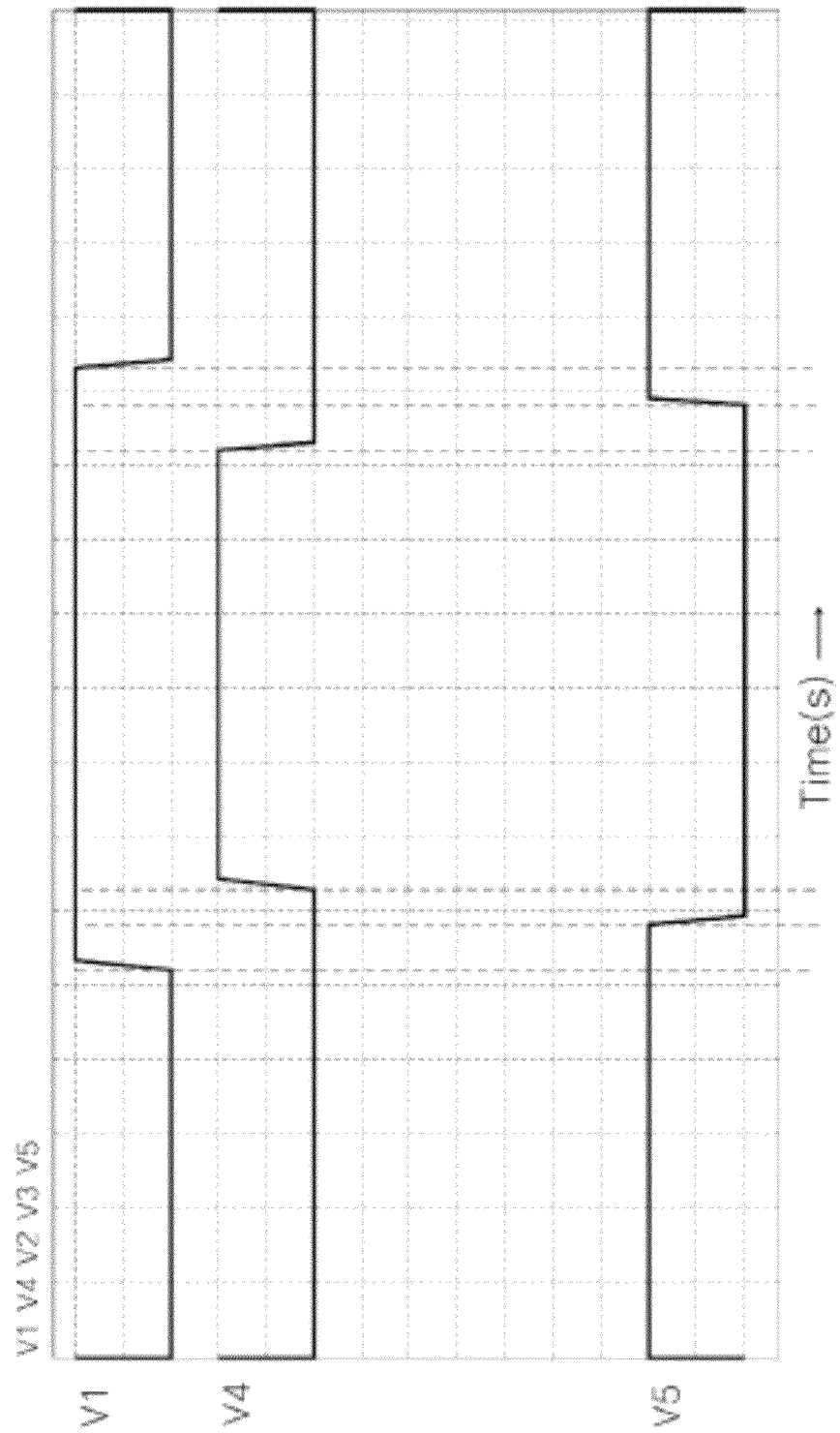
FIG. 4 shows the V1, V4, V5 semiconductor switches gatings in a single PWM modulation period.

FIG. 3 shows the V2 and V3 transistors on and off positions are slightly shifted to each other so that the switching losses of V3 and V5 transistors can be reduced.

It can be seen that also V1 and V4 transistors on and off positions are slightly shifted to each other so that the switching losses of V1 and V5 transistors can be reduced.

The used time shifting depends on the applied type of semiconductor device switching behavior.

V5 transistor shall be off state position if the current discontinuous and cross the zero current level.

The required reactive power generated by the shift of the angle of the switching pattern of all switching devices what is synchronized to the U utility network voltage.

The sign and value of shifting angle and the inverter output voltage will define the reactive power amplitude and sign (leading or lagging).

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

The invention claimed is:

1. An inverter comprising:
an AC output connected to a utility grid through a first reactor and a second reactor;
an energy storage capacitor connected to a photovoltaic (PV) array terminal, wherein
a first half bridge and a second half bridge respectively is connected to the positive (+) and negative (−) terminals of the energy storage capacitor, and wherein
the first half bridge comprises a first transistor and a second transistor and the second half bridge comprises a third transistor and a fourth transistor; and
a first, second, third, fourth, fifth, and sixth diodes being arranged between the first half bridge and the second half bridge, the first and second diodes arranged facing the third and fourth diodes respectively each other, and the fifth diode arranged facing the sixth diode, wherein
a first node of the first half bridge is connected to an anode of the first diode and a second node of the first half bridge is connected to a cathode of the second diode, a first node of the second half bridge is connected to an anode of the third diode and a second node of the second half bridge is connected to a cathode of the fourth diode, and the first, second, third and fourth diodes being formed a diode bridge, and wherein
a positive node of the diode bridge is connected to collectors of the first and third transistors and an anode of a fifth diode, the cathode of the fifth diode is connected to a positive terminal of the energy storage capacitor, and wherein a negative node of the diode bridge is connected to emitters of the second and fourth transistors and an anode of the sixth diode, and the anode of the sixth diode connected to the negative terminal of the energy storage capacitor.

2. The inverter according to claim 1, wherein the first second, third, and fourth transistors comprise reverse diodes.

3. The inverter according to claim 1, wherein the inverter consists of the first, second, third, and fourth diodes.

4. The inverter according to claim 1, wherein the PV array terminal is connected through an electromagnetic compatibility (EMC) filter to the energy storage capacitor.

5. The inverter according to claim 1, further comprising:
one or more booster units configured between the PV array terminal and the energy storage capacitor.

6. The inverter according to claim 1, wherein the second terminal of the each of the first and second reactors is connected to each other through a filter capacitor.

7. The inverter according to claim 1, further comprising:
a fifth transistor, wherein
cathodes of the first and third diodes and an anode of fifth diode are connected to a collector of the fifth transistor.

8. The inverter according to claim 1, wherein an emitter of the first transistor, a collector of the second transistor, an anode of the first diode and a cathode of the second diode are connected to a first terminal of the second reactor.

9. The inverter according to claim 1, wherein an emitter of the third transistor, an anode of the third diode, a cathode of the fourth diode and a collector of the fourth transistor are connected to a first terminal of the first reactor.

10. The inverter according to claim 1, wherein an emitter of the fifth transistor and anodes of the second and fourth diodes are connected to a cathode of the sixth diode, wherein a second terminal of the first reactor is connected to a first terminal of the utility grid.

11. The inverter according to claim 10, wherein the second terminal of the second reactor is connected to a second terminal of the utility grid and F ground terminal.

* * * * *